United States Patent [19]
Sakamoto

[11] 3,822,405
[45] July 2, 1974

[54] CHANNEL SELECTING APPARATUS

[75] Inventor: Yoichi Sakamoto, Takatsuki, Japan

[73] Assignee: Matsushita Electric Industrial Co. Ltd., Osaka, Japan

[22] Filed: Dec. 5, 1972

[21] Appl. No.: 312,325

[30] Foreign Application Priority Data
Dec. 10, 1971 Japan............................ 46-100528
Dec. 10, 1971 Japan............................ 46-100529
Dec. 10, 1971 Japan............................ 46-100530
Dec. 10, 1971 Japan............................ 46-100531
Dec. 10, 1971 Japan............................ 46-100532
Dec. 10, 1971 Japan............................ 46-100533
Dec. 10, 1971 Japan............................ 46-100534
Dec. 10, 1971 Japan............................ 46-100535

[52] U.S. Cl. .......................... 325/464, 325/470
[51] Int. Cl. .......................................... H04b 1/34
[58] Field of Search ........... 325/332, 333, 334, 418, 325/419, 420, 421, 422, 423, 464, 465, 468, 458, 459, 469, 470; 334/14, 15, 16, 17, 18, 20, 26; 333/17; 331/2, 4, 32, 46, 48, 49, 55

[56] References Cited
UNITED STATES PATENTS
2,891,157  6/1959  Hansell ........................ 325/455 X
2,954,465  9/1960  White .......................... 325/334 X
3,611,152  10/1971 Sakai et al. ..................... 325/469
3,641,434  2/1972  Yates et al. ................... 325/421 X
3,651,411  3/1972  Zlotnick ........................ 325/470
3,701,951  10/1972 Krausser ........................ 325/455

Primary Examiner—Benedict V. Safourek
Attorney, Agent, or Firm—Stevens, Davis, Miller & Mosher

[57] ABSTRACT

Channel selecting apparatus wherein it comprises two local oscillators each of which can oscillate with its frequency swept by a sweep voltage, the two local oscillators are so set as to alternately perform sweep initiation and sweep termination, the frequency interval between the sweep initiation and the sweep termination is made equal to a channel frequency interval or $1/n$ ($n$ being an integer) thereof, the number of times of the sweep initiation or sweep termination is counted, to detect that the operation has been performed by a desired number of times, the sweep of one of the local oscillators is stopped upon the detection, the sweep voltage at the stop is stored, it is applied to a variable reactance element to make the reception possible, a flip-flop is provided which is actuated upon entrance of two signals, and the operation of a circuit for storing the voltage is made by an OR signal between a signal [1] produced by the second one of the two signals and a signal [1] stopping the sweep after the detection of the desired number of times of the operation of the local oscillators.

13 Claims, 12 Drawing Figures

Figure 2:
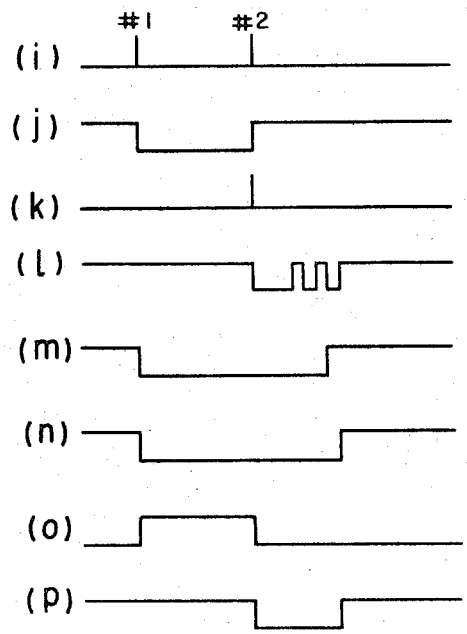

FIG. 2
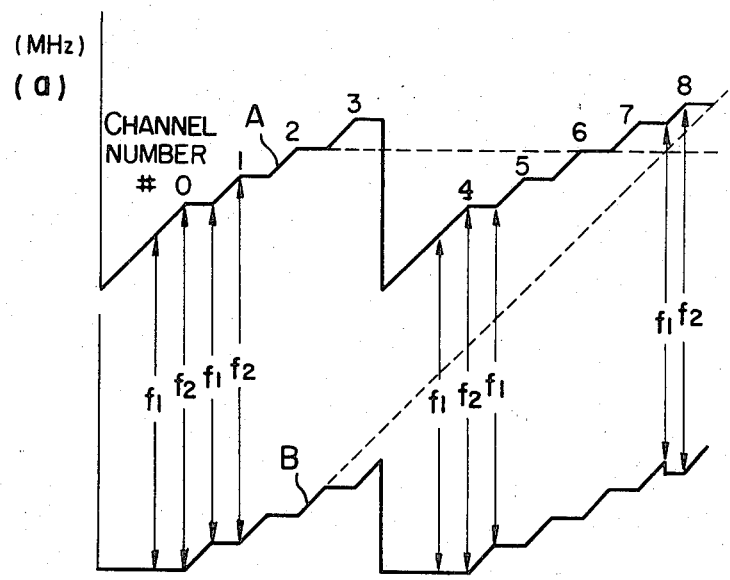
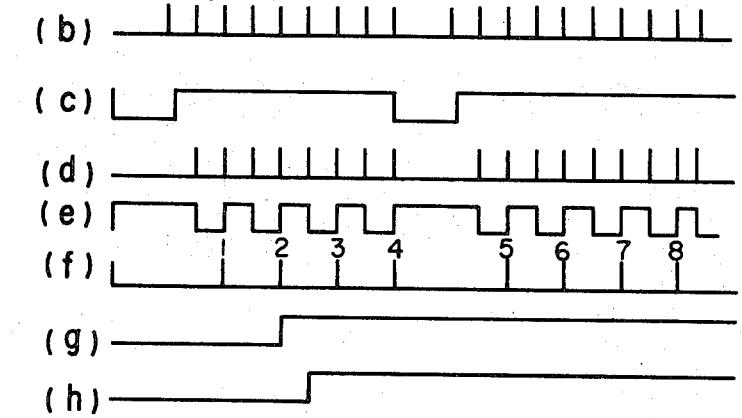

CHANNEL SELECTING APPARATUS

The present invention relates to channel selecting apparatus employing varactor diodes as tuning elements.

As methods for obtaining a tuning voltage to be applied to a varactor diode, there have heretofore been two types of a method which uses push buttons and volume controls for presetting, and the so-called automatic tuning in which the sweep is stopped when a predetermined intermediate-frequency signal is produced by applying voltages to the varactor diode from a voltage sweep circuit. The former is inconvenient in that volume controls are required by the number of channels for reception, to unavoidably lead to a large-sized apparatus, and that presetting work is required for every channel at installation of the apparatus or as may be needed. Although the latter makes the digital display possible, it is disadvantageous in being unstable since the sweep can stop due to voice carrier waves and since a particular one of the receiving channels can change to another on account of interruption or weakness of the incoming electric waves.

Channel selecting apparatus has therefore been contrived in which two local oscillators each adapted to operate with the frequency swept by sweep voltages are provided, the two local oscillators are so set as to alternately conduct the sweep initiation and the sweep termination, the frequency interval between the sweep initiation and the corresponding sweep termination is made equal to the channel frequency interval, the alternate sweep operations are started from the carrier frequency of the lowest frequency channel of a broadcasting band, the number of times of the sweep initiations or terminations is counted to detect that the aforesaid operations have been carried out by a desired number of times, the sweep of the concerned one of the local oscillators is stopped upon detection, and the sweep voltage at the stop is stored, to receive the desired broadcast.

The present invention intends to stabilize the operation of such channel selecting apparatus. More specifically, an object of the present invention is to attain such stabilization of the channel selecting operation that the channel selecting operation is prevented from being disturbed by received electric waves after the starting of the channel selecting operation till completion of establishment of the receiving state, that when a certain channel is changed to another channel by depressing keys in a keyboard, a different channel is prevented from being selected in the course of the change, that unnecessary voices are prevented from being given forth during the period from the starting of the channel selecting operation to the completion of setting of the receiving state, and that even where a manipulator has depressed only one of two places of keys of the channel selecting keyboard and has let it stand, a correct operation can be effected at the next manipulation.

Figure 1:
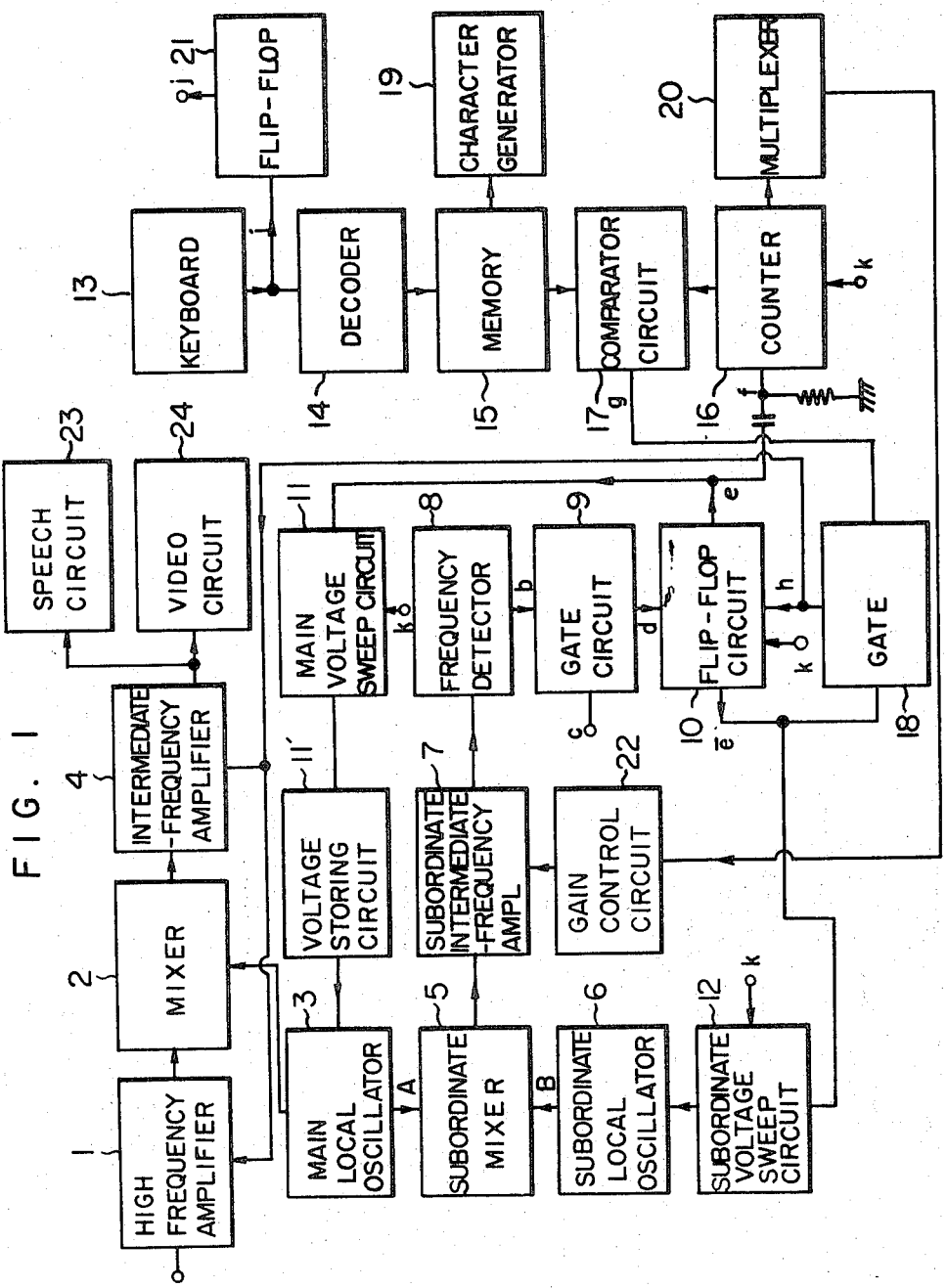
Figure 7:
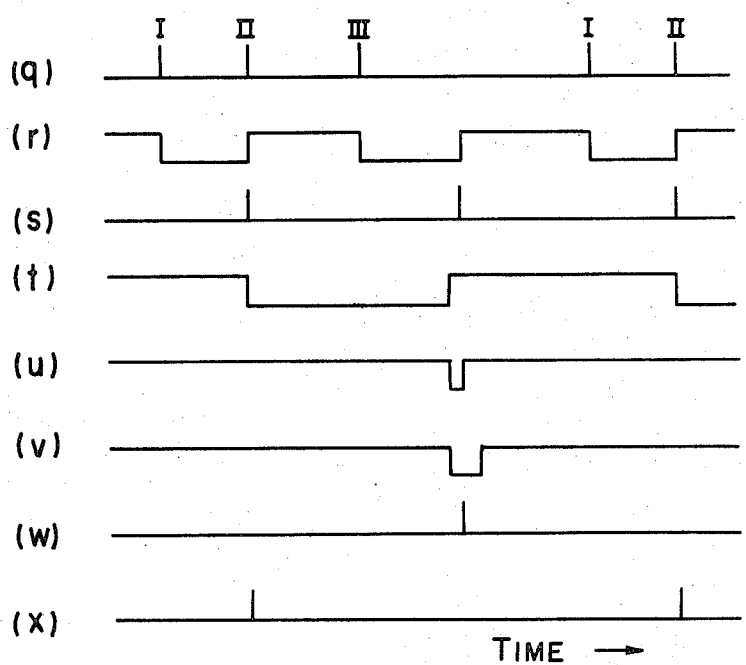
Figure 8:
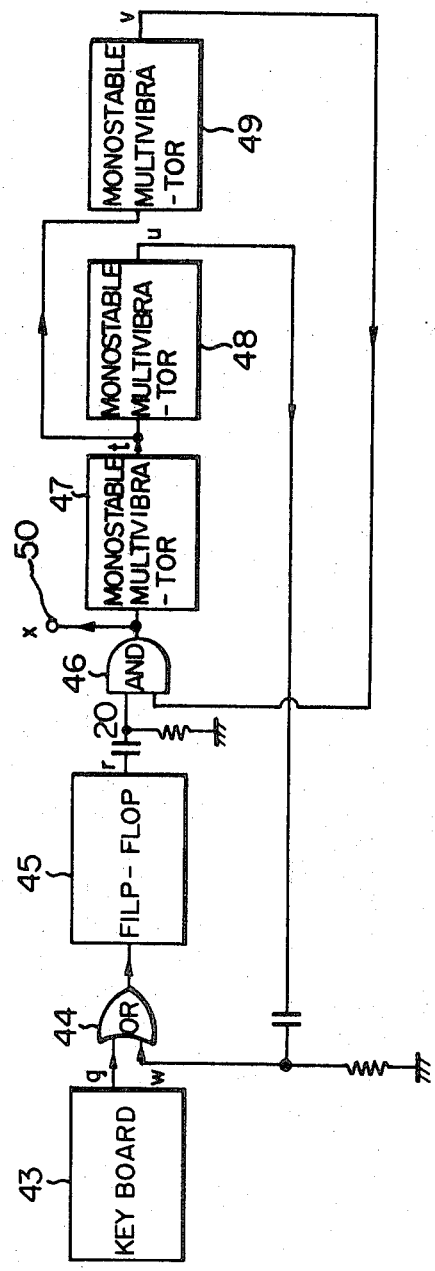
Figure 9:
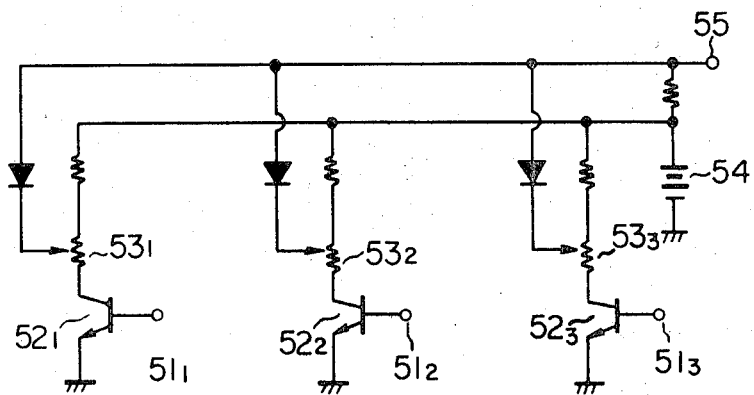
Figure 10:
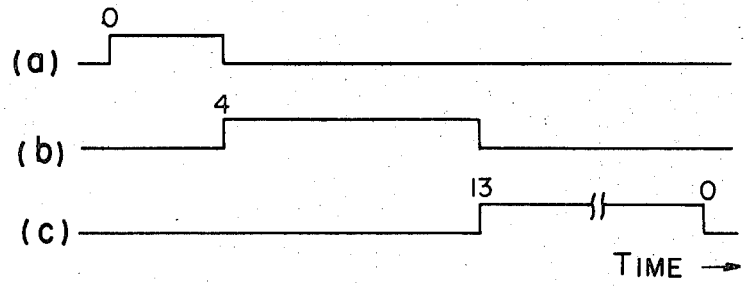
Figure 11:
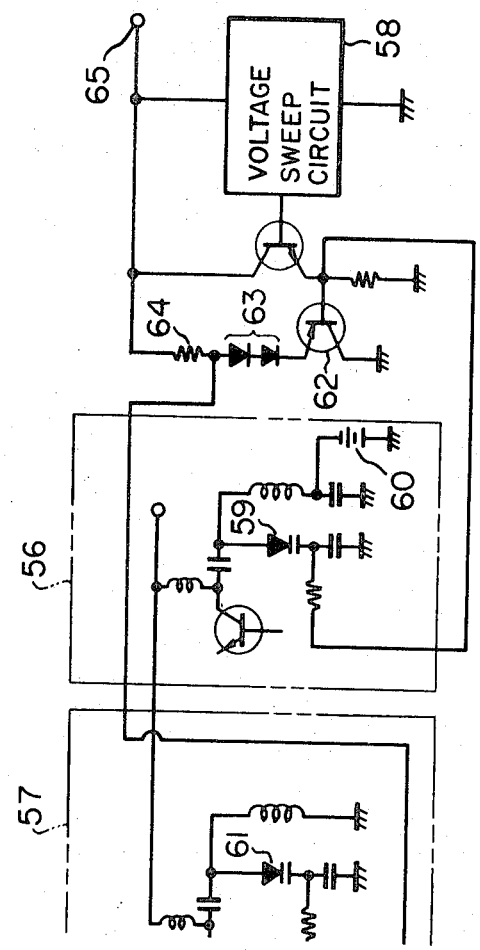

Description will now be made of the preferred embodiments of the invention with reference to the accompanying drawings, in which:

FIG. 1 is a block diagram of channel selecting apparatus according to an embodiment of the present invention;

FIGS. 2(a) to 2(p) are characteristic diagram and wave-form diagrams for explaining the apparatus;

FIGS. 3, 4, 5 and 6 are circuit diagrams each showing a practical form of a part of the apparatus;

FIGS. 7(a) to 7(x) are wave-form diagrams for explaining the apparatus;

FIGS. 8, 9 and 11 are circuit diagrams each showing a practical form of a part of the apparatus; and FIGS. 10(a) to 10(c) are wave-form diagrams for explaining the apparatus.

Referring to FIG. 1, numeral 1 designates a high-frequency amplifier, 2 a mixer, 3 a main local oscillator, 4 an intermediate-frequency amplifier, 5 a subordinate mixer, 6 a subordinate local oscillator, 7 a subordinate intermediate-frequency amplifier, 8 a frequency detector, 9 a gate circuit, 10 a flip-flop circuit, 11 a main voltage sweep circuit, 11' a voltage storing circuit, and 12 a subordinate voltage sweep circuit.

The operation of the above construction will be explained with reference to FIG. 2. The oscillation frequencies of the main local oscillator 3 are indicated by A in FIG. 2(a), while those of the subordinate local oscillator 6 by B. It is now assumed that, when a reset signal is entered, the main local oscillator 3 starts its operation from the sweeping state, while the subordinate local oscillator 6 from the sweep-stopped state. When the difference $\Delta f$ between the main local oscillation frequency and the subordinate local oscillation frequency reaches $f_1$, a pulse is generated from the frequency detector 8. The pulse $f_1$, however, is erased by an erasing signal (FIG. 2(c)) whose leading edge corresponds to the reset signal and whose trailing edge corresponds to a signal obtained by delaying the first pulse $f_1$. When the sweep of the main local oscillation frequencies is continued to reach $f_2$ in the frequency difference $\Delta f$, the second one of the $\Delta f$ detecting pulses shown in FIG. 2(b) is generated. The pulse passes through the gate circuit 9, and enters the flip-flop 10 to invert the state thereof. The outputs of the flip-flop 10 bring the main voltage sweep circuit 11 into the sweep-stopped state, and the subordinate voltage sweep circuit 12 into the sweeping state. With the frequency difference of the leftmost $f_2$ in FIG. 2(a), accordingly, the main sweep A is stopped, while the subordinate sweep B is started. When the frequency difference of $f_1$ is next reached, the $\Delta f$ detecting pulse is generated, and hence, the main sweep and the subordinate sweep are inverted again in respect of their condition. Thereafter, the main sweep and the subordinate sweep alternately occupy the sweeping state and the sweep-stopped state in the similar way as illustrated in FIG. 2(a).

If the difference between $f_1$ and $f_2$ is so set as to be equal to a channel frequency interval, the main local oscillator and the subordinate local oscillator perform staircase-like sweep by which the sweep-stopped state is produced at every channel frequency interval alternately between them. If the main local oscillation frequency under the first sweep-stopped state is chosen at the (carrier frequency + intermediate frequency) of the first channel of a broadcast band, the frequencies of the respective stairs of the staircase-like sweep become equal to the local oscillation frequencies of the respective channels.

Description will now be made of a method for stopping the sweep at a desired channel and indicating the channel. When the number of the desired channel is keyed in a keyboard 13, the output is fed through a decoder 14 into a memory 15. Output pulses of the flip-flop 10 (FIG. 2(e)) are counted by a counter 16. The counted number and the number stored in the memory 15 are compared by a comparator circuit 17. When they coincide, a coincidence signal shown in FIG. 2(g) is provided. When they do not coincide, a signal of non-coincidence is provided. The signals are applied to a gate 18. The gate 18 constitutes an AND circuit between the other output (than the output to the counter 16) of the flip-flop 10 and the coincidence signal. When the AND gate is herein enabled, a stop signal shown in FIG. 2(h) is provided. The outputs in FIGS. 2(b) to 2(h) appear at the parts of the same characters (a) to (h) in FIG. 1. In FIG. 1, 19 represents a character generator for displaying the number stored in the memory 15, and it is made of, for example, read only memory. Shown at 20 is a multiplexer which is actuated by the output of the counter 16. It generates a broadcast band switching pulse, to reset the main and subordinate voltage sweep circuits 11 and 12. If the stop signal in FIG. 2(h) does not appear, the frequency sweep A is reset for the band change-over to be lower than the lowest local oscillation frequency of the band (including channel Nos. 0 to 3) within which the channel selecting apparatus has been operating, while the frequency sweep B is reset at a frequency lower by $f_2$ than the local oscillation frequency of the first channel of the new band (channel Nos. 4 to 8 are shown). In FIG. 2(a), the scales of the frequency axes of the sweep frequencies A and B between Channels 3 and 4, i.e., at the band change-over (as referred to hereinafter, Channel 3 belongs to the lower VHF band, and Channel 4 to the higher VHF band in Japan) are moved in parallel in the representation for the sake of explanation. The fact that the frequency interval between Channel Nos. 7 and 8 is smaller than the others, is attained since the subordinate sweep oscillation frequency is lowered by 2 MHz by making use of the signal from the multiplexer 20. Although, as to the band change-over, only that between Channels 3 and 4 is illustrated in FIG. 2, that between Channels 12 and 14 or between the VHF and UHF bands is similar.

When it is now desired to receive Channel 2, keys in the keyboard 13 are depressed as [0, 2]. Then, the signals in FIGS. 2(g) and 2(h) are generated. The main and subordinate sweep frequencies A and B become as illustrated by dotted lines in FIG. 2(a) due to the signals. The frequency sweep A is stopped, so that Channel 2 can be received. When it is subsequently desired to receive another channel, for example, Channel 4, keys in the keyboard 13 are depressed as [0, 4]. Then, the foregoing operation is repeated, to make the reception of Channel 4 possible. In the course of the operation, however, the carry of "2" is performed, and the number of "20" is entered into the memory 15. Therefore, the staircase waves of the sweep frequencies A and B in FIG. 2(a) intend to continue till Channel No. 20. It is accordingly possible that Channel 20 is once received before the reception of Channel 4. Otherwise, when Channel 20 is an idle channel, the picture of Channel 2 is no longer on the screen, which gives the manipulator an unstable feeling or uneasy sense for the receiving set.

If, therefore, a flip-flop 21 adapted to be actuated by entrance of two inputs $i$ (FIG. 2(i)) from the keyboard is provided, the output $j$ (FIG. 2(j)) of the flip-flop is differentiated into a reset signal $k$ (FIG. 2(k)), the signal $k$ is applied to the main and subordinate voltage sweep circuits 11 and 12, and it is also applied to the flip-flop 10 as well as the counter 16, then it is expected that, at the change-over of the reception from Channel [0, 2] to [0, 4], the latter can be selected without passing through Channel [2, 0]. However, the voltage memory circuit 11' storing the output of the main sweep circuit 11 is adapted to initiate the storing action by the stop signal $h$, so that if the non-coincidence signal is outputted from the comparator 17, the circuit 11' loses the voltage storing action. In consequence, when Channel [2, 0] is passed through, the storage of Channel [0, 2] disappears.

Figure 3:
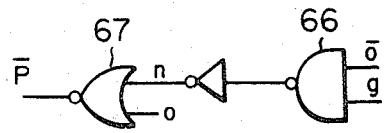
Figure 4:
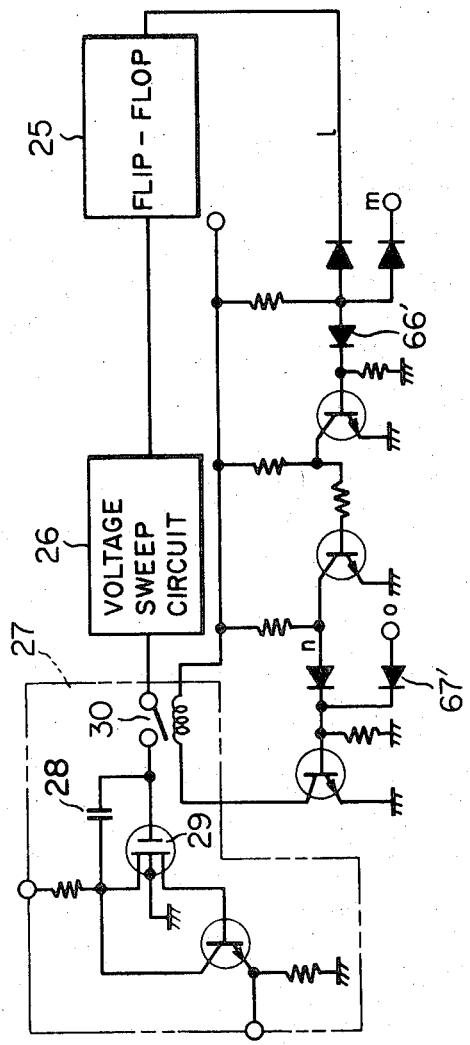

In order to prevent the drawback, the operation in FIG. 2 has been realized by a logical circuit in FIG. 3. The practical form is shown in FIG. 4. The operation until the reset signal in FIG. 2(k) is produced, is as has been previously stated. The flip-flop 10 is reset by the reset signal $k$, and provides an output $l$ (FIG. 2(l)). It does not exert any influence on the voltage storing circuit 11'. However, the number [20] is fed into the memory 15 due to the keyboard input No. 1. Since it does not coincide with the number [02] stored in the counter 16, the coincidence signal exhibits noncoincidence as illustrated in FIG. 2(m). The AND output between the signals $l$ and $m$ becomes as in FIG. 2(n). Next, when an OR operation is performed between the output $n$ and a signal $o$ (FIG. 2(o)), i.e. the inversion of the output $j$ of the locking flip-flop 21, the output becomes as in FIG. 2(p). It is understood that the signal $p$ shifts from the upper level to the lower level for the first time at the second keyboard input No. 2, namely, at the time of the initiation of the channel selection. In FIG. 4, numeral 25 indicates a flip-flop, which corresponds to the flip-flop 10 in FIG. 1. Shwon at 26 is a voltage sweep circuit, which corresponds to the circuit 11 in FIG. 1. A voltage storing circuit 27 comprises a capacitor 28, a MOS transistor 29 and a switch 30, and corresponds to the circuit 11' in FIG. 1. The switch 30 is adapted to be opened when the signal in FIG. 2(p) is of the upper level, and to be closed when it is of the lower level. Therefore, the switch is closed upon initiation of the channel selection, and is opened upon establishment of the receiving state. With the foregoing operation, the voltage stored in the voltage storing circuit does not disappear at the first depression of the keyboard, and it disappears for the first time at the second depression. At the second depression, however, the channel selecting operation is already started, and the voltage storing circuit need be already coupled with the voltage sweep circuit. Thus, just an appropriate result is obtained.

Figure 5:
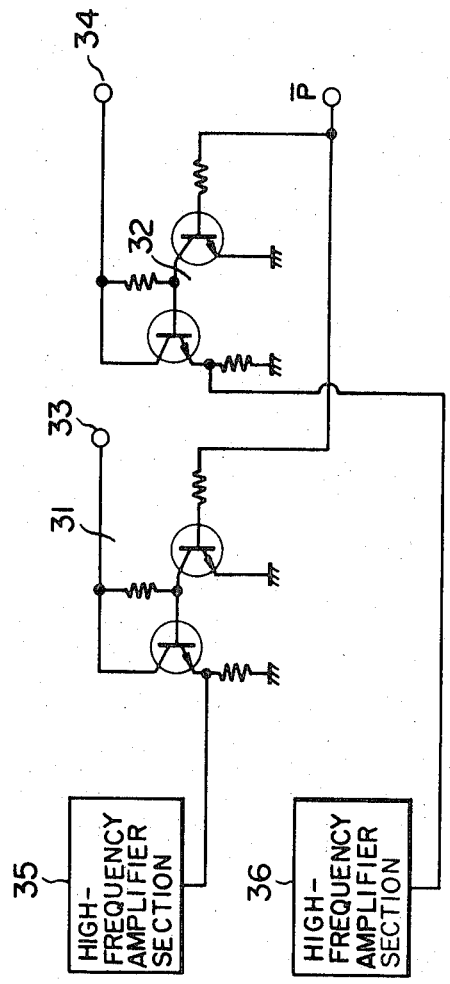

FIG. 5 shows a circuit for eliminating instability of the operation by the signal $p$ during the channel selection, in which operation the main sweep circuit and the subordinate sweep circuit sweep the frequencies such that they are alternately occupying the sweeping and sweep-stopped states, the instability being attributable to the fact that jamming signals (principally broadcast waves in this case) are entered into the high-frequency amplifier section of the tuner. Numerals 31 and 32 represent switching circuits, which control a power source 33 for a VHF tuner and a power source 34 for a UHF tuner by a signal $\bar{p}$ with the polarity of the signal $p$ inverted, respectively. Shown at 35 and 36 are a high-frequency amplifier section of the VHF tuner and that of the UHF tuner, respectively. Since the circuit is thus constructed, the power supplies of the respective high-frequency amplifier sections of the VHF and UHF tuners are disconnected while the signal in FIG. 2(p) lies between the initiation of the channel selection and the establishment of the receiving state, that is, while the channel selecting operation is being conducted. The jamming waves are therefore prevented from arriving. It is accordingly possible to stably sweep the frequencies as the sweep and the stop of the sweep are being repeated.

Figure 6:
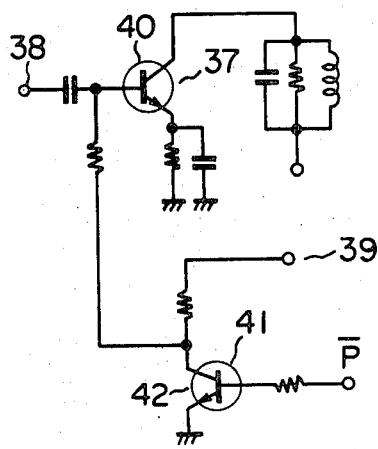

There will now be described a method for eliminating the unstable feeling and the unpleasant feeling which are imparted to the screen and voices of the receiving set by reason that the main sweep frequencies A in FIG. 2(a) are produced in the staircase state. Referring to FIG. 6, numeral 37 designates an intermediate-frequency amplifier circuit of the receiver, 38 an input terminal of an intermediate-frequency signal, 39 a termainl of an AGC signal for automatically controlling the amplification degree of the intermediate-frequency amplifier, 40 a transistor whose amplification degree is varied by the AGC voltage appearing at the terminal 39, and 41 a transistor which is turned on and off by the polarity-inverted signal $\bar{p}$ of the signal $p$. While the polarity-inverted signal $\bar{p}$ of the signal $p$ is at the higher level, the transistor 41 is kept conductive, and hence, the potential of its collector 42 is substantially equal to the earth potential. The intermediate-frequency amplification degree of the transistor 40 is accordingly lowered greatly, to ultimately make the amplification degree of the intermediate-frequency amplifier 4 in FIG. 1 substantially zero. As a result, no input is fed into an audio circuit 23 and a video circuit 24 (FIG. 1), and intermittent sounds and disturbance on the screen induced when the main sweep frequencies are produced in the staircase state are eliminated. Accordingly, the manipulator can perform the manipulation with a stable feeling, and never senses the unpleasant sounds and pictures.

While the method by which the amplification degree of the intermediate-frequency amplifier is lowered by the polarity-inverted signal $\bar{p}$ of the signal $p$ has been described above with reference to FIG. 6, there are further methods, one by which the power supply of the intermediate-frequency amplifier is disconnected, one by which the amplification degrees of the andio circuit 23 and the video circuit 24 are lowered, and so forth. However, the method of clamping the AGC voltage of the intermediate-frequency amplifier is the simplest. While the method having been stated with reference to FIG. 6 effects the control using the polarity-inverted signal $\bar{p}$ of the signal $p$, it is understood that the amplification degree of the intermediate-frequency amplifier may be lowered during the period during which the sweep frequencies in FIG. 2 are swept in the form of the staircase. The signals in FIGS. 2(i) – 2(p) correspond to the signals of the symbols mentioned in FIGS. 1, 3, 4, 5 and 6.

In case where, after completion of the operation in FIG. 2 or the operation having thus far been explained, the manipulator erroneously depresses one key of the keyboard and leaves it as it is, the receiving channel remains the previously one, and therefore, it becomes impossible for the manipulator to see whether the next depression is the first one or the second one. This can lead to an erroneous manipulation. FIGS. 7(q) to 7(x) are diagrams for explaining the operation of a circuit which serves to prevent such erroneous manipulation from arising. FIG. 8 is a diagram of the construction of the circuit. Signals in FIGS. 7(q) to 7(x) are those appearing in FIG. 8, and respectively correspond to the symbols mentioned in FIG. 8. The operation is as stated above till the second keyboard input II.

When a keyboard 43 is depressed three times, a signal III in FIG. 7(q) appears. The signal passes through an OR circuit 44, and enters a flip-flop 45. Without an operation stated hereunder, the next depression of the keyboard will produce a reset signal since the output (FIG. 7(r)) of the locking flip-flop 45 has been turned from the upper level to the lower level. The construction to be now explained intends to restore the locking flip-flop 45 (which corresponds to the flip-flop 21 in FIG. 1) to the original state without providing the reset signal. When the keyboard input II is entered, a signal is fed through an AND circuit 46 into a monostable multivibrator 47. Then, the nonostable multivibrator 47 is actuated to generate a signal in FIG. 7(t). The actuation time is suitably set. For example, it is selected at a value which is sufficiently longer than a period of time usually required for the manipulator to depress the keyboard twice; but which is shorter than a period of time in which he notices the erroneous operation and depresses the keyboard over again. The second monostable multivibrator 48 and the third monostable multivibrator 49 are actuated by the signal in FIG. 7(t), to respectively generate outputs shown in FIGS. 7(u) and 7(v). A signal in FIG. 7(w) as is obtained by differentiating the output $u$ of the monostable multivibrator 48, is applied to the OR gate 44. The flip-flop 45 has its state inverted into the original one by the signal $w$. If the output of the flip-flop 45 at the restoration is made the reset signal without any change, herein will be reset the main and subordinate sweep circuits 11 and 12, the counter 16 and the flip-flop 10. Therefore, the signal $r$ is erased using the output $v$ of the third monostable multivibrator 49 and by the AND gate 46. A signal having passed through the AND gate 46 appears at a terminal 50. It is made a reset signal $x$ (FIG. 7(x)), and can be supplied in place of the reset signal $k$ in FIG. 2.

FIG. 9 is a diagram showing the construction of a block 22 in FIG. 1 in detail. The output voltage from the multiplexer 20 is shown by FIGS. 10(a) to 10(c) in correspondence with the numbers equivalent to channel Nos. as are being counted by the counter 16. It is now assumed that the signal in FIG. 10(a) is applied to a terminal $51_1$, the output in FIG. 10(b) to a terminal $51_2$, and the output in FIG. 10(c) to a terminal $51_3$. Then, transistors $52_1$, $52_2$ and $52_3$ are respectively rendered conductive while the counter 16 is counting channel Nos. within the lower VHF band of the television broadcast (Channels 1 – 3 in the State of Japan), within the higher VHF band (Channels 4 – 12 in the same) and within the UHF band (Channels 13 – 62 in the same). Accordingly, a current flows through a load resistance of each transistor in response to the output of the multiplexer. A divided voltage of a power source 54 also appears at the tap of each variable resistor as is constituted of a part of the load resistance, in response to the output of the multiplexer. Since the outputs in FIGs. 10(a), 10(b) and 10(c) are always such that only one of the signals is at the upper level while the other two signals are at the lower level, only one is rendered conductive among the transistors $52_1$, $52_2$ and $52_3$ at a time. Accordingly, a voltage preset in response to the output of the multiplexer, namely, in response to a broadcast band appears at a terminal 55. The amplification degree of the subordinate intermediate-frequency amplifier 7 in FIG. 1 is controlled by utilizing the voltage.

The oscillation frequency bands of the main local oscillator 3 and the subordinate local oscillator 6 are also controlled by the multiplexer 20. The output levels have large differences between every band, but do not have very large differences within one band. Accordingly, if the amplification degree of the subordinate intermediate-frequency amplifier 7 is controlled with the voltage from the terminal 55 in FIG. 9, inputs to the frequency detector 8 have no large differences. Although an automatic gain control circuit is required, in essence, in a signal system consisting of the local oscillators 3 and 6, subordinate mixer 5 and subordinate intermediate-frequency amplifier 7, it is made unnecessary by the construction described above.

FIG. 11 shows a circuit which determines the reference frequency of the subordinate sweep frequencies in FIG. 2(a), and a circuit which serves to prevent from deviating from normal ones the differences between local oscillation frequencies and tuned frequencies for the high-frequency amplification as arise in that case. In the figure, numeral 57 indicates a local oscillator, 57 a high-frequency amplifier section, and 58 a voltage sweep circuit. Let it now be supposed that, when the voltage sweep circuit 58 is reset and reaches the lowest voltage, the value of the voltage is zero volt (the earth potential). Then, the voltage of a power source 60 is impressed on one terminal of a varactor diode 59 of the local oscillator 56. At this time, the reference frequency shall be generated. If the output voltage of the circuit 58 is impressed on one terminal of a varactor diode 61 of the high-frequency amplification section 57 without any change, the tracking between the local oscillation and the high-frequency amplification becomes impossible. Because the reference-voltage power source 60 is connected to the other terminal of the varactor diode of the local oscillator 56, whereas the other terminal of the varactor diode of the high-frequency amplification section 57 is grounded. It is therefore necessary to apply to the high-frequency section a voltage equivalent to the voltage of the power source 60 superposed on the sweep voltage. Accordingly, the sum between the emitter-base voltage of a transistor 62 in FIG. 11 and the forward voltage of a group of diodes 63 is superposed on the output of the voltage sweep circuit 58, to apply the resulting superposed voltage to the varactor diode 61 for the high-frequency amplifier. With silicon diodes and silicon transistors, usually the voltages induced in the above-mentioned elements are approximately 0.67 V, and the temperature coefficients are −2 mV/°C or so. For a high-frequency amplification section of wide band, therefore, the circuit can be constructed using the devices.

Although the aforesaid high-frequency amplifier is to be interposed between the subordinate local oscillator 6 and the subordinate mixer 5 in FIG. 1, the high-frequency amplifier at this part can be omitted in some cases, and hence, it is not depicted in FIG. 1. Instead, in case where the frequencies A and B in FIG. 2(a) are made opposite, the foregoing relation holds between the main high-frequency amplifier 1 and the main local oscillator 3, and the effect is demonstrated.

The channel selecting apparatus constructed as described above, has a variety of effects as follows:

1. In case where it is desired to receive through a keyboard manipulation a broadcast the channel No. of which consists of two places, a voltage stored in a voltage storing circuit does not disappear when, under a state under which another channel is being received, the place of 10 of the desired channel is keyed, that is, the first key is depressed. The voltage disappears for the first time when the place of 1 is keyed, that is, the second key is depressed. Therefore, a picture does not disappear from the screen during the period between the first and second depressions of the keyboard. This can give the manipulator a stable feeling.

2. In case where it is desired to receive through a keyboard manipulation a broadcast the channel No. of which consists of two places, the power supply of the high-frequency amplification section of the tuner is not disconnected but is normally operating when, under a state under which another channel is being received, the place of 10 of the desired channel is keyed, that is, the first key is depressed. The power supply of the high-frequency amplification section of the tuner is turned off for the first time when the place of 1 is keyed, that is, the second key is depressed. There can be eliminated in this way the instability of an operation in which a main sweep circuit and a subordinate sweep circuit perform the frequency sweeps as they are alternately repeating the sweeping state and the sweep-stopped state, the instability being attributable to jamming waves.

3. In case where it is desired to receive through a keyboard manipulation a broadcast the channel No. of which consists of two places, the gains of video- and audio-signal amplification systems occupy normal values when, under a state under which another channel is being received, the place of 10 of the desired channel is keyed, that is, the first key is depressed. The gains of the amplification systems are largely lowered for the first time when the place of 1 is keyed, that is, the second key is depressed. There are eliminated intermittent sounds and disturbance on the screen of a receiving set as are otherwise caused when the main sweep circuit and the subordinate sweep circuit perform the sweeps while alternately repeating the sweeping and sweep-stopped states. This gives the manipulator a stable sense.

4. As a method for eliminating the intermittent sounds and disturbance on the screen which arise during the staircase wave voltage sweep in channel selecting apparatus utilizing two sweep circuits adapted to alternately repeat the sweep and the stop of the sweep, the automatic gain control circuit of an intermediate-frequency amplifier is clamped during the staircase wave sweep so that the attenuation degree may become extremely high. Thus, signals of the video- and audio-systems can be attenuated more easily than in clipping the signals separately for the video- and audio-systems.

5. In apparatus wherein in case where it is desired to receive through a keyboard manipulation a broadcast the channel No. of which consists of two places, the voltage storing circuit, the high-frequency amplifier circuit and the intermediate-frequency amplifier circuit are normally operating when, under a state under which another channel is being received, the place of 10 of the desired channel is keyed, that is, the first key is depressed, and they are reset for the first time when the place of 1 is keyed, that is, the second key is depressed, whereby the channel selecting operation is started; even if the third key is erroneously depressed, the circuits revert automatically. Therefore, the manipulator is prevented from conducting erroneous manipulations.

6. Since the gain of a subordinate intermediate-frequency amplifier can be controlled every broadcast band by the output of a multiplexer, the necessity for an automatic gain control circuit for the signal system of a subordinate local oscillator, a subordinate mixer and a subordinate intermediate-frequency amplifier is removed.

7. A construction in which a voltage at the time that a voltage sweep circuit is reset and reaches the lowest voltage is zero volt or the earth potential, is readily obtained. However, where the lowest voltage is desired to be set at a certain value other than the earth potential, the construction is difficult since the whole voltage sweep circuit need be isolated from the earth potential. The difficulty can be solved in such way that the sum between the emitter-base voltage of a transistor and the forward voltage of a group of diodes is superposed on the output of the voltage sweep circuit.

8. In order that when one of two sweep circuits adapted to sweep while alternately repeating the sweep and the stop of the sweep, i.e., that sweep circuit (subordinate local oscillator) in the previous explanation which starts sweeping from the reference frequency of the subordinate sweep frequencies in FIG. 1, is reset, the oscillation of the reference frequency may be done, it is required to apply a reference voltage of the negative polarity to one terminal of a varactor diode of the local oscillator so as to produce a reverse-bias voltage of the varactor diode, since a voltage for application as is reset to zero volt is impressed on the other terminal of the varactor diode. If, at this time, one terminal of a varactor diode of the high-frequency amplification section is grounded and the other terminal has the sweep voltage (the above-mentioned voltage for application) impressed thereon, an inferior tracking takes place between the high-frequency amplification section and the local oscillator. If the reference voltage is also applied to the one terminal of the varactor diode of the high-frequency amplification section, the portion need be grounced high-frequencywise. This is unpreferable since the construction of the tuner becomes complicated, and besides, the performance is degraded. Therefore, the sum between the emitter-base voltage of a transistor and the forward voltage of a group of diodes is superposed on the sweep voltage applied to the varactor diode of the local oscillator, to make the resultant voltage the voltage for application to the varactor diode of the high-frequency amplification section. Thus, the difference between both the sweep voltages is always kept constant, making the tracking possible.

What is claimed is:
1. Channel selecting apparatus, comprising:
a main local oscillator and a subordinate local oscillator, each producing swept frequency oscillations;
means applying a sweep voltage to said oscillators to produce swept frequency oscillations from said oscillators;
sweep control means coupled to said main and subordinate local oscillators for causing said oscillators to alternately perform sweep initiation and sweep termination at a channel frequency interval or an integral multiple thereof;
a counter coupled to said sweep control means for counting the number of sweep initiations and sweep terminations performed by said main and subordinate local oscillators;
keying means for selecting the number of a desired channel for display;
a memory coupled to said keying means for storing the selected channel number;
a comparator coupled to said counter and said memory for comparing the outputs of said counter and said memory to produce coincidence and non-coincidence signals, depending on the coincidence or non-coincidence between the outputs of said counter and memory;
a gate circuit coupled to said comparator and said sweep control means for terminating a sweep by said main local oscillator to complete the selection of a desired channel when a coincidence signal from said comparator appears at the corresponding input of said gate circuit; and
start selection means coupled to an output of said keying means for generating a channel selection starting signal, said start selection means being coupled to said sweep control means and said counter to apply thereto the channel selection starting signal, said start selection means generating the channel selection starting signal for the first time when two keys of said keying means are depressed to thereby alternately initiate and terminate the sweeping of said main and subordinate local oscillators.

2. Channel selecting appartus, comprising:
a main local oscillator and a subordinate local oscillator, each producing swept frequency oscillations;
a main voltage sweep circuit coupled to said main local oscillator through a voltage storing circuit for applying a sweep voltage to said main local oscillator;
a subordinate voltage sweep circuit coupled to said subordinate local oscillator for applying a sweep voltage to said subordinate local oscillator;
sweep control means coupled to said main and subordinate local oscillators and to said main voltage and subordinate voltage sweep circuits and including means for detecting a frequency difference between oscillation frequencies of said main and subordinate local oscillations and for producing a corresponding difference signal, said sweep control means controlling said main and subordinate local oscillators through said main voltage and subordinate voltage sweep circuits to perform sweep initiation and sweep termination alternately at a channel frequency interval or an integral multiple thereof;
a counter coupled to said sweep control means for counting the number of sweep initiations and sweep terminations performed by said main and subordinate local oscillators;
keying means for selecting the number of a desired channel for display;
a memory coupled to said keying means for storing the selected channel number;
a comparator coupled to said counter and said memory for comparing the outputs of said counter and said memory to produce coincidence and non-coincidence signals depending on the coincidence or non-coincidence between the outputs of said counter and memory;

a gate circuit coupled to said comparator, said sweep control means, and said main voltage and subordinate voltage sweep circuits for terminating a sweep by said main voltage sweep circuit and for holding a voltage in said voltage storing circuit to thereby terminate a sweep by said main local oscillator to complete the selection of a desired channel when a coincidence signal from said comparator appears at the corresponding input of said gate circuit; and means for generating a channel selection starting signal coupled to an output from said keying means and coupled to inputs of said sweep control means, said counter and said main voltage and subordinate voltage sweep circuits to apply thereto the channel selection starting signal, said starting signal generating means generating the channel selection starting signal for the first time when two keys of said keying means are depressed to thereby alternately initiate and teminate sweeping by said main and said subordinate local oscillators.

3. Channel selecting apparatus according to claim 2, further comprising means for producing a control signal connected between said sweep control means and said voltage storing circuit, said control signal producing means including means changing the level of said control signal only during a period from the generation of said channel selection starting signal until the completion of the channel selection operation, and wherein said control signal is applied to said voltage storing circuit to thereby maintain a voltage stored in said voltage storing circuit until two keys of said keying means have been depressed.

4. Channel selecting apparatus according to claim 3, further comprising: an intermediate amplifier; wherein said means for producing a control signal is connected between said sweep control means and said intermediate frequency amplifier to clamp an automatic gain control signal in said intermediate frequency amplifier and to lower the gain of said intermediate frequency amplifier.

5. Channel selecting apparatus according to claim 2, further comprising a high frequency amplifier which amplifies an antenna input; and means for producing a control signal connected between said sweep control means and said frequency amplifier to apply said control signal to said high-frequency amplifier to inhibit the operation of said high-frequency amplifier during the channel selection operation of said channel selecting apparatus.

6. Channel selecting apparatus according to claim 2, further comprising: an intermediate amplifier; and means for producing a control signal connected between said sweep control means and said intermediate frequency amplifier, said control signal being applied to said intermediate frequency amplifier to lower video and audio amplification degrees in said intermediate frequency amplifier.

7. Channel selecting apparatus according to claim 2, wherein said sweep control means includes a flip-flop circuit coupled to the output of said frequency difference detecting means, said flip-flop circuit being triggered to change state when said detecting circuit detects that the frequency difference between oscillation frequencies of said main and subordinate local oscillators reaches a predetermined value, the complementary outputs of said flip-flop being applied to said main voltage and subordinate voltage sweep circuits, respectively, for effecting control thereof.

8. Channel selecting apparatus according to claim 7, wherein:
said counter is coupled to one of the two outputs from said flip-flop circuit to count the number of oscillator sweep initiation and sweep termination signals generated by said flip-flop circuit; and
said gate circuit comprises an AND gate having one input coupled to the coincidence signal output from said comparator and a second input coupled to the other output from said flip-flop circuit, the output of said AND gate being coupled to an input of said flip-flop circuit to reset the flip-flop circuit in accordance with an output from said AND gate.

9. Channel selecting apparatus according to claim 8, wherein:
said means for generating a channel selection starting signal comprises a further flip-flop circuit, which produces a first signal presenting a predetermined voltage level during a time period between depressions of first and second keys of said keying means, which voltage level is different from the voltage level of a second signal produced by said further flip-flop circuit in other time periods, and a differentiating circuit for differentiating said first output signal of said further flip-flop circuit for generating said channel selection starting signal; and
said main voltage sweep circuit includes a switch circuit connected between an output of said main voltage sweep circuit and an input of said voltage storing circuit, and means for closing said switch circuit upon initiation of a channel selection operation and for opening said switch circuit upon reception of a selected channel.

10. Channel selecting apparatus according to claim 8, wherein:
said means for generating a channel selection starting signal comprises a further flip-flop circuit which produces a first signal presenting a predetermined voltage level during a time period between depressions of first and second keys of said keying means, which voltage level is different from the voltage level of a second signal produced by said further flip-flop circuit in other time periods, and a differentiating circuit for differentiating said first output signal of said further flip-flop circuit for generating said channel selection starting signal; and
said channel selecting apparatus further includes switching circuits connected respectively between a power source and a high-frequency amplifier for VHF, and between the power source and a high-frequency amplifier for UHF, and means for closing said switching circuits upon initiation of a channel selection operation and for opening said switch circuits upon reception of a selected channel.

11. Channel selecting apparatus according to claim 2, wherein said main local oscillator is connected to a high-frequency amplifier for amplifying an antenna input and wherein a reference voltage is applied to a terminal of a varactor diode of a tank circuit of said main local oscillator, said terminal of said varactor diode being opposite to the other terminal to which a channel selecting voltage is applied, and wherein a voltage of a sum between an emitter-base voltage of a transistor and a forward voltage of a group of diodes and having the same degree of magnitude as said reference voltage is superposed on said channel selecting terminal of a tuning varactor diode of said high-frequency amplifier, and the other terminal of said tuning varactor diode is grounded.

12. Channel selecting apparatus according to claim 2, wherein said means to generate said channel selection starting signal for the first time when said two keys are depressed comprises a flip-flop which is actuated upon entrance of two signals, a device by which a signal produced by the second signal is made a reset signal, a first monostable multivibrator to which said signal produced by said second signal is inputted, second and third monostable multivibrators which are actuated by a signal produced at completion of the operation of said first monostable multivibrator, means to apply to said flip-flop a signal produced at completion of the operation of said second monostable multivibrator and to thus set said flip-flop at a state under which its output is, and means to eliminate said reset signal by an output of said third monostable multivibrator.

13. Channel selecting apparatus according to claim 2, comprising: a subordinate intermediate-frequency amplifier which mixes outputs of said two local oscillators and thus provides a subordinate intermediate frequency, the sweep initiation and the sweep termination of said two local oscillators being reversed when said subordinate intermediate frequency becomes a reference frequency, and means to switch a gain of said subordinate intermediate-frequency amplifier for every broadcast band.

* * * * *